(12) United States Patent
Beier et al.

(10) Patent No.: US 9,914,081 B2
(45) Date of Patent: Mar. 13, 2018

(54) AIRCRAFT ENGINE WITH AN APPARATUS FOR SEPARATING OIL AND A DEVICE FOR INCREASING PRESSURE

(71) Applicant: Rolls-Royce Deutschland Ltd & Co KG, Blankenfelde-Mahlow (DE)

(72) Inventors: Juergen Beier, Schulzendorf (DE); Gideon Venter, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 99 days.

(21) Appl. No.: 14/959,179

(22) Filed: Dec. 4, 2015

(65) Prior Publication Data

US 2016/0158679 A1 Jun. 9, 2016

(30) Foreign Application Priority Data

Dec. 5, 2014 (DE) .................. 10 2014 117 960

(51) Int. Cl.
| | | |
|---|---|---|
| *B01D 45/08* | (2006.01) | |
| *B01D 45/12* | (2006.01) | |
| *F01D 25/18* | (2006.01) | |
| *F02C 7/06* | (2006.01) | |
| *B64D 27/10* | (2006.01) | |
| *F01D 15/12* | (2006.01) | |

(52) U.S. Cl.
CPC ............. *B01D 45/12* (2013.01); *B64D 27/10* (2013.01); *F01D 15/12* (2013.01); *F01D 25/18* (2013.01); *F02C 7/06* (2013.01); *F05D 2220/323* (2013.01); *F05D 2260/609* (2013.01)

(58) Field of Classification Search
CPC ......... B01D 45/12; B64D 27/10; F01D 15/12; F01D 25/18; F02C 7/06; F05D 2220/323; F05D 2260/609
See application file for complete search history.

(56) References Cited

U.S. PATENT DOCUMENTS

| | | |
|---|---|---|
| 6,033,450 A | 3/2000 | Krul et al. |
| 8,640,436 B2 | 2/2014 | Thies |
| 2014/0096533 A1 | 4/2014 | Homeyer et al. |

FOREIGN PATENT DOCUMENTS

| | | |
|---|---|---|
| DE | 102008031186 A1 | 1/2010 |
| DE | 102009060051 A1 | 6/2011 |
| DE | 102012218135 A1 | 4/2014 |
| EP | 1582703 A2 | 10/2005 |
| EP | 1820944 A2 | 8/2007 |
| EP | 2559869 A1 | 2/2013 |

OTHER PUBLICATIONS

European Search Report dated Apr. 21, 2016 from counterpart EP App No. 15198120.6.
German Search Report dated Jul. 22, 2015 from counterpart German App No. 10 2014 117 960.9.

*Primary Examiner* — Dung H Bui
(74) *Attorney, Agent, or Firm* — Timothy J. Klima; Shuttleworth & Ingersoll, PLC

(57) ABSTRACT

An aircraft engine having a device for separating oil from an air-oil volume flow, where a fluid volume flow with a lower oil load than the air-oil volume flow supplied to the device can be discharged from the device via a line area. The fluid volume flow can be supplied via the line area to a unit by means of which a pressure in the line area downstream of the unit can be increased.

8 Claims, 8 Drawing Sheets

Figure 1:
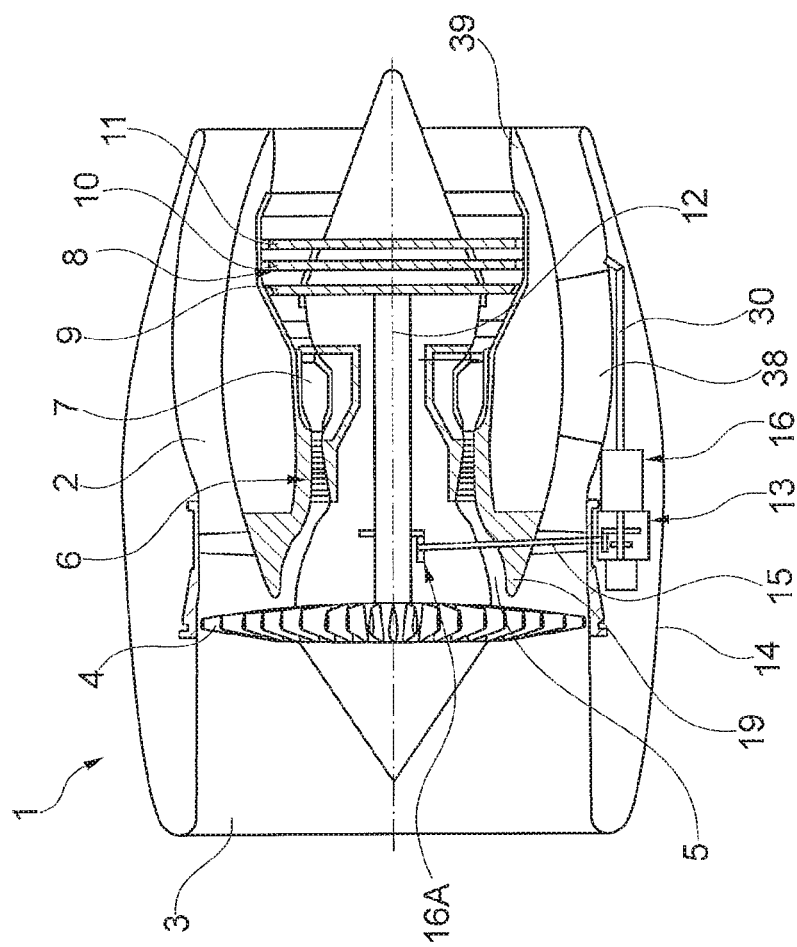

AIRCRAFT ENGINE WITH AN APPARATUS FOR SEPARATING OIL AND A DEVICE FOR INCREASING PRESSURE

This application claims priority to German Patent Application 102014117960.9 filed Dec. 5, 2014, the entirety of which is incorporated by reference herein.

This invention relates to an aircraft engine having a device for separating oil from an air-oil volume flow supplied to the device, in accordance with the disclosure herein.

In jet engines known from actual practice, oil-containing consumed air is supplied during operation from bearing chambers and from an oil tank via separate lines to a device for separating oil from an air-oil volume flow, which device can be designed as an oil separator, preferably as a centrifugal oil separator, and is also referred to as a breather. The separation of large oil particles from the consumed air or from the air-oil volume flows out of the bearing chambers and the oil tank is achieved by a deflection area provided in the area of the breather and acting as a centrifuge. Oil particles with smaller diameters are collected by a metal foam arranged inside the oil separator and so likewise filtered out of the air. The oil separated by means of this procedure is returned to the oil circuit. The cleaned air is discharged to the environment. Cleaned air is understood as a fluid volume flow discharged from the oil separator and having a lower oil load than the air-oil volume flow supplied to the oil separator.

In conventional engine systems, the cleaned air has a pressure only slightly above the ambient pressure of an aircraft engine. If this level of pressure applies, the cleaned air disadvantageously cannot be introduced into a bypass duct of an aircraft engine, since operating pressures several times higher than the ambient pressure usually prevail in a bypass duct. To allow the cleaned air to be introduced nevertheless into the bypass duct, in other engine systems the cleaned air is subjected to an air volume flow taken from a core flow of an engine and having a higher pressure level than the air volume flow passed through the bypass duct. The air volume flow taken from the core flow is also referred to as compressor bleed air and is used to increase the pressure of the cleaned air, which then has a pressure level required to introduce the cleaned air into the bypass duct.

The latter engine systems have however the disadvantage that the tapping of compressor bleed air affects an efficiency of an aircraft engine and results in a higher fuel consumption and a rise in the temperature inside the air system. Moreover, this procedure requires control devices for maintaining a sufficiently large pressure difference between the pressure of the cleaned air and the pressure in the bypass duct area for introduction.

It is known from EP 2 559 869 A1 to arrange upstream of a separator unit a synchronizer device by means of which a flow of an air-oil mixture supplied to the separator unit is synchronized with a rotation of said separator unit. Furthermore, U.S. Pat. No. 6,033,450 discloses a blade wheel arranged upstream of an oil separator and with which a rotation speed of the air-oil mixture supplied to the oil separator is already achieved with a concomitant pressure increase in the area of the blade wheel, where a separation of the air-oil mixture in the area of the blade wheel is achieved by means of said blade wheel.

With the described arrangements of the blade wheels upstream of the respective separator unit or oil separator, however, the pressure of the cleaned airflow downstream of the breather cannot be raised to the extent required to introduce the fluid volume flow into the bypass duct. In the area of the blade wheels and hence upstream of the oil separator, the pressure of the air-oil volume flow is increased if necessary. The embodiments known from the state of the art are designed with outlet openings for discharging separated oil from the oil separator. During flow through the oil separator, pressure losses occur in the area of the outlet openings, which reduce the pressure downstream of the oil separator back to an undesirably low level.

The object underlying the present invention is to provide an aircraft engine operable at high efficiency with a device for separating oil from an air-oil volume flow supplied to the device, using which cleaned air can be discharged to the required extent from the aircraft engine in the area of the device.

It is a particular object of the present invention to provide a solution to the above problems by an aircraft engine having features as disclosed herein.

The aircraft engine in accordance with the invention is designed with a device for separating oil from an air-oil volume flow, where a fluid volume flow with a lower oil load than the air-oil volume flow supplied to the device can be discharged from the device via a line area.

In accordance with the invention, the fluid volume flow can be supplied via the line area to a unit by means of which a pressure in the line area downstream of the unit can be increased.

By the provision of a separate unit downstream of the device, a pressure of the fluid volume flow or of the cleaned air downstream of the device can be increased to the required extent by a simple design, without air at high pressure having to be taken from a core flow duct of the aircraft engine to do so. Temperatures in an air system of the engine are as a result lower than when high-pressure air from the core flow duct is used. Sealing properties of the engine are not negatively affected either with the aircraft engine in accordance with the invention. Efficiency of the aircraft engine is advantageously high as a result.

With the unit in accordance with the invention, the pressure of the fluid volume flow or of the cleaned air downstream of the unit can be increased in a low-loss manner to a required pressure level during operation of the aircraft engine, so that a required pressure difference can be achieved between the pressure of the cleaned air downstream of the unit and the area in which the cleaned air is discharged out of the aircraft engine. Since the unit is arranged downstream of the device and the cleaned air subjected to pressure in the area of the unit can be discharged directly out of the aircraft engine, pressure losses of the cleaned air downstream of the unit can be avoided with the arrangement of the unit in accordance with the invention by a simple design. A back pressure in an air system of the engine is here generally determined by a pressure in the area of an outlet for the cleaned air from the engine.

The pressure increase downstream of the unit reduces a pressure upstream of the unit during operation of the aircraft engine. As a result, an air-oil volume flow supplied for example from bearing chambers and an oil tank to the device for separating oil is advantageously drawn by the unit in the direction of the device. In the area of the bearing chambers, a lower pressure prevails in the embodiment in accordance with the invention when compared with conventional embodiments, without a unit for increasing a pressure during operation of the aircraft engine, so that a lower quantity of compressed air taken from the core flow of the aircraft engine is required for sealing off the bearing chambers. As a result, a power loss of the engine is in turn reduced in an advantageous manner.

If the unit for increasing a pressure is arranged inside the line area in an advantageous development of the aircraft engine or jet engine in accordance with the invention, the unit can be integrated in a compact manner into the aircraft engine.

In an advantageous embodiment of the aircraft engine in accordance with the invention, it is provided that the line area interacts with a further line area, where said further line area issues into a core flow duct or a bypass duct of the aircraft engine. The cleaned air passed via the further line area can, with a correspondingly large pressure increase in the area of the unit, in principle be introduced into any area of the bypass duct, of the core flow duct or even directly into the environment, so that the further line area can advantageously be designed short, with corresponding weight advantages. For example, the line area can also issue into an area of the aircraft engine referred to as a mixer, in the area of which the bypass duct and the core flow duct are connected to one another. The introduction of the cleaned air into the bypass duct or core flow duct also has the advantage that due to a residual oil proportion possibly present in the cleaned air, a casing of the engine is not discoloured by oil. In addition, this reduces the risk of a smoke plume being generated.

The unit for increasing a pressure is preferably designed as a compressor device, in particular as an axial compressor device or as a radial compressor device. An axial compressor device preferably taking up an entire cross-section of the line area is to be preferred in particular here when only a low pressure increase has to be achieved in the area of the unit and a relatively large volume flow of cleaned air is passed through the line area. If by contrast a large pressure increase is to be achieved in the area of the unit, with a relatively low volume flow of cleaned air being passed through the line area, a radial compressor device is suitable in particular.

A pressure downstream of the unit can, in a simply designed embodiment of an aircraft engine, be increased by designing the unit for increasing a pressure with several blades arranged spread over the circumferential side. The unit can here be designed for example as an impeller wheel.

To provide the pressure increase achieved in the area of the unit to the required extent and in line with the prevailing operating states, the blades of the unit are, in an advantageous embodiment of the aircraft engine in accordance with the invention, designed bent or curved relative to a flow direction of the cleaned air in the axial direction, in the radial direction and/or in the circumferential direction. Furthermore, it can also be provided that the blades are inclined relative to the axial direction, the radial direction or the circumferential direction of the unit.

With a particularly compact embodiment of an aircraft engine in accordance with the invention, the blades of the unit for increasing a pressure are designed integrally with ribs or fillets running in particular in the axial direction of the unit and provided for example for mounting a part of the device for separating oil, in particular from a porous area of the device designed as an oil separator. Using the ribs or fillets arranged, in particular, spread over the circumferential side relative to the device, the porous area or a metal foam of the device is mounted on a diameter area which is larger than that on which the unit is mounted.

The line area to which the unit is assigned is, in an advantageous embodiment of the aircraft engine in accordance with the invention, formed by a shaft designed at least in some sections as a hollow shaft, which in particular represents an accessory gearbox shaft of an accessory gearbox. If the unit is non-rotatably connected to the shaft, the unit is advantageously driven together with the device via the shaft or accessory gearbox shaft.

The accessory gearbox can here be arranged both in the area of an outer casing of the aircraft engine and in the area of a casing separating a bypass duct from a core flow duct.

The unit for increasing a pressure can, in a simply designed embodiment of the invention, have a helically designed area, with the unit in particular taking up a completely circular cross-section of the line area preferably formed by the hollow shaft and preferably fixed relative to the line area both in the circumferential direction, for example by means of a tongue-and-groove connection, and in the axial direction, for example by means of spring-loaded locking rings. As a result, the line area is driven together with the unit at an identical speed. The flow cross-section, through which flows air cleaned in the area of the device, tapers here in the flow direction of the cleaned air in the area of the unit, so that the pressure downstream of the unit is increased to the required extent during a rotation of the unit.

To drive the unit in a simply designed manner, the unit for increasing a pressure can be driven by an accessory gearbox shaft of an accessory gearbox provided in particular also to drive the device for separating oil. A rotary axis of the unit is here in particular arranged concentrically to a rotary axis of the device.

In an advantageous embodiment of an aircraft engine in accordance with the invention, the device for separating oil is provided with a porous area that can be set into rotation and is arranged in the flow path of the air-oil volume flow supplied to the device for example from a bearing chamber or an oil tank, and can be passed by the air-oil volume flow. Oil particles from the air-oil volume flow supplied to the device can be separated by means of the device that can be designed as an oil separator, preferably as a centrifugal oil separator, and is also referred to as a breather, in a simple manner and for example supplied to an oil tank. An area of the device acting as a centrifuge is provided in particular for the separation of large oil particles, whereas oil particles of lower diameters can advantageously be collected by the metal foam arranged in the oil separator and so likewise filtered out of the air.

Both the features stated in the patent Claims and the features stated in the following exemplary embodiments of the aircraft engine in accordance with the invention are each suitable, singly or in any combination with one another, to develop the subject matter of the invention.

Further advantages and advantageous embodiments of the aircraft engine in accordance with the invention become apparent from the patent Claims and the exemplary embodiments described in principle in the following with reference to the accompanying drawing, where the same reference numerals are used for components of identical design and function for greater clarity.

Figure 2:
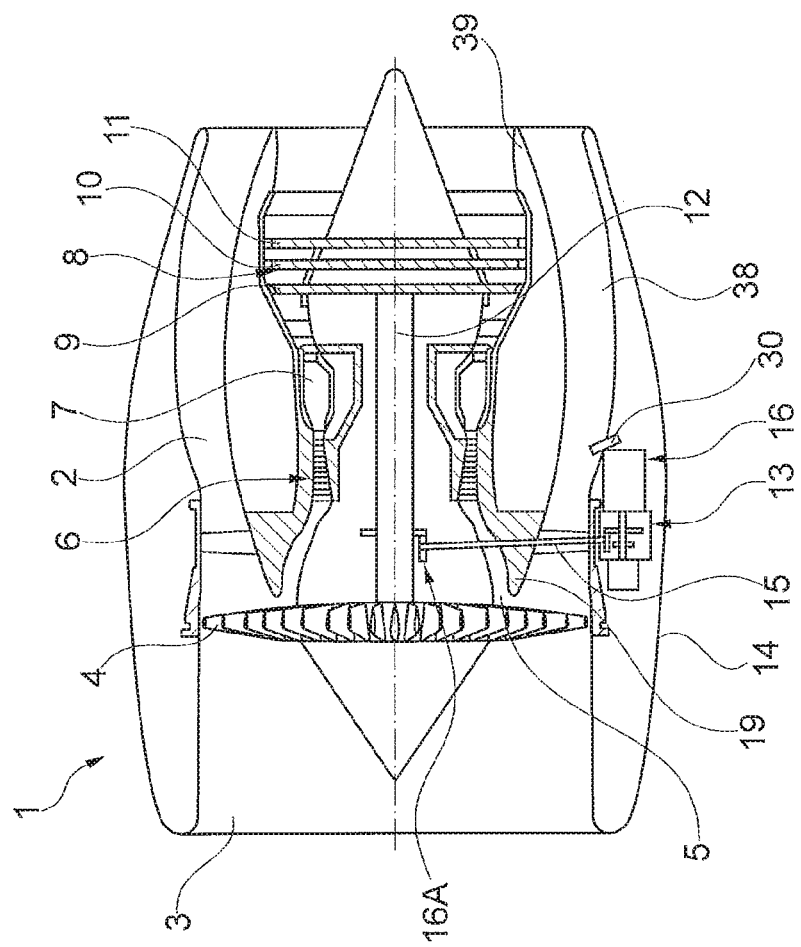
Figure 3:
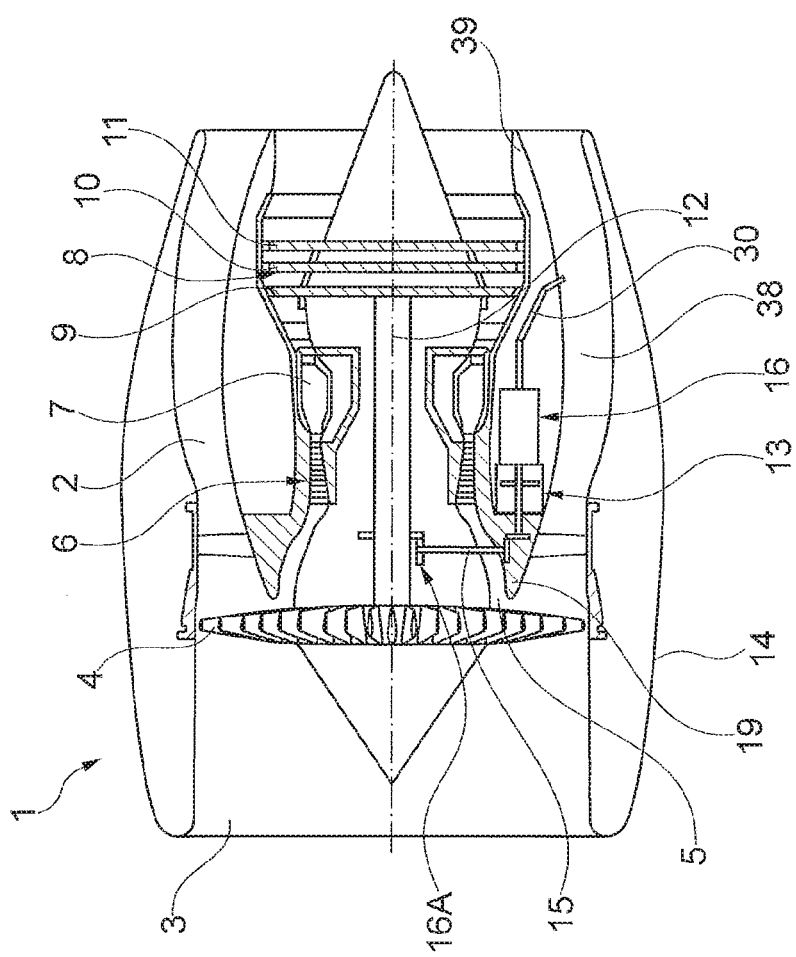
Figure 4:
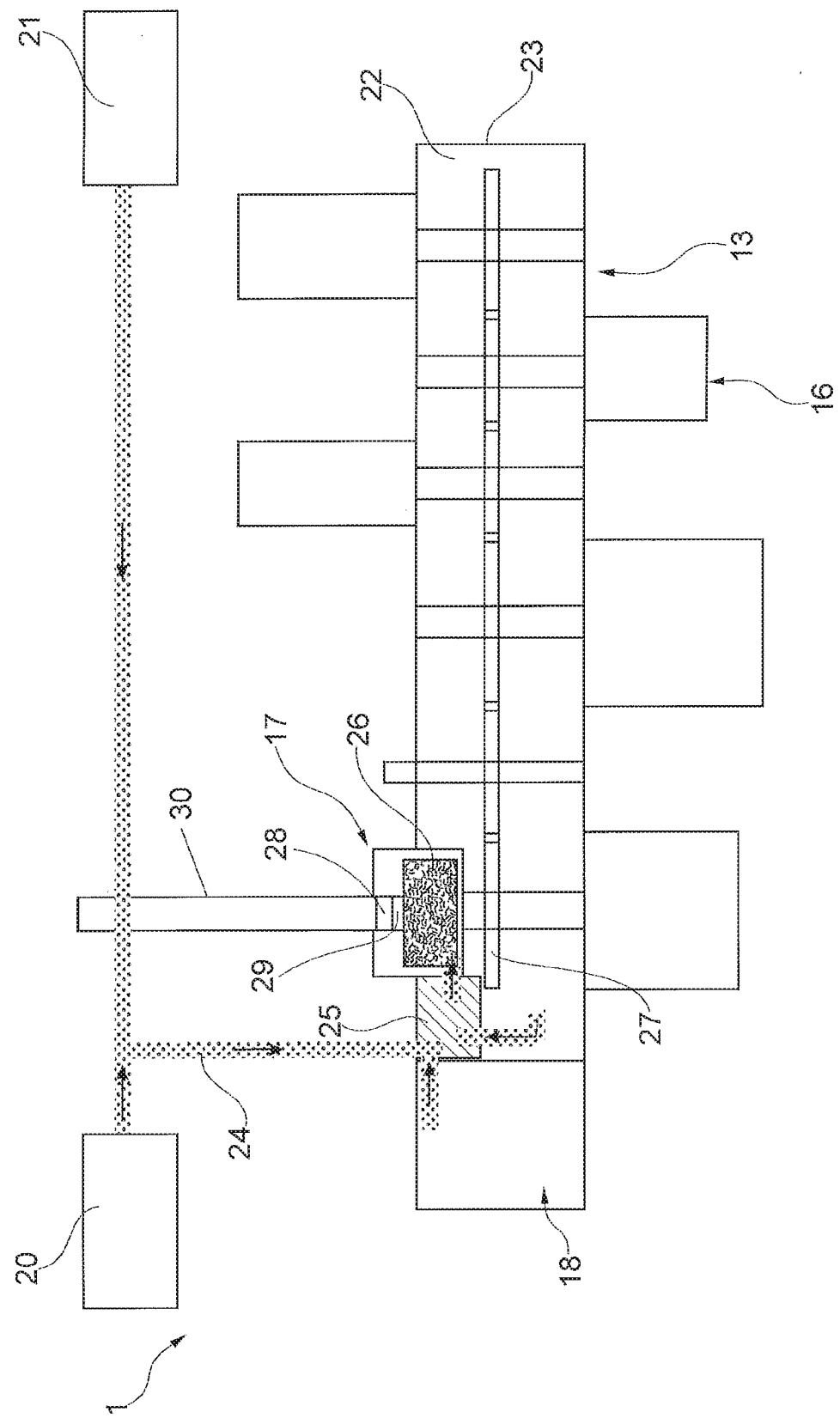
Figure 5:
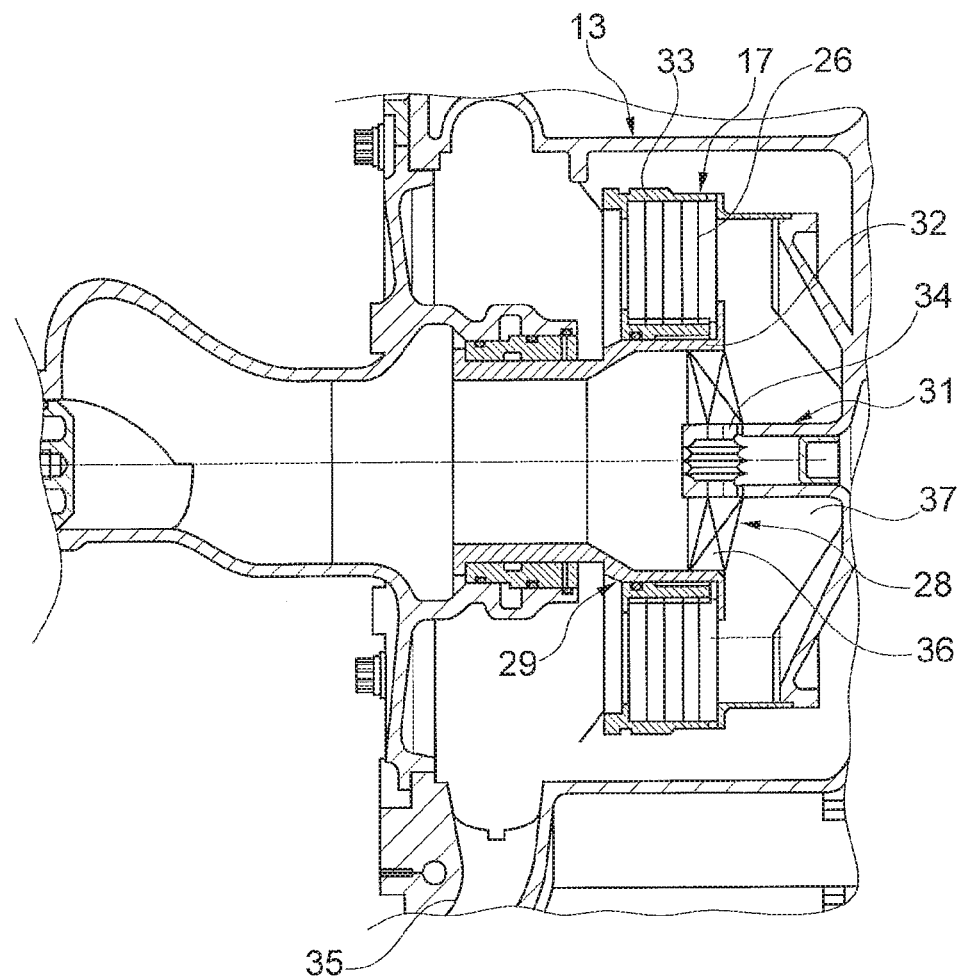
Figure 6:
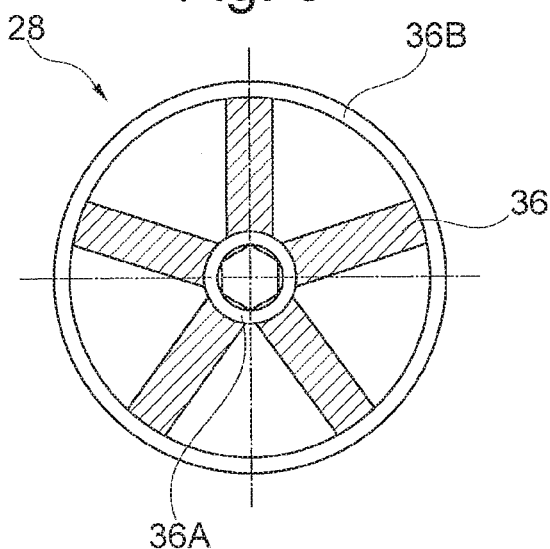
Figure 7:
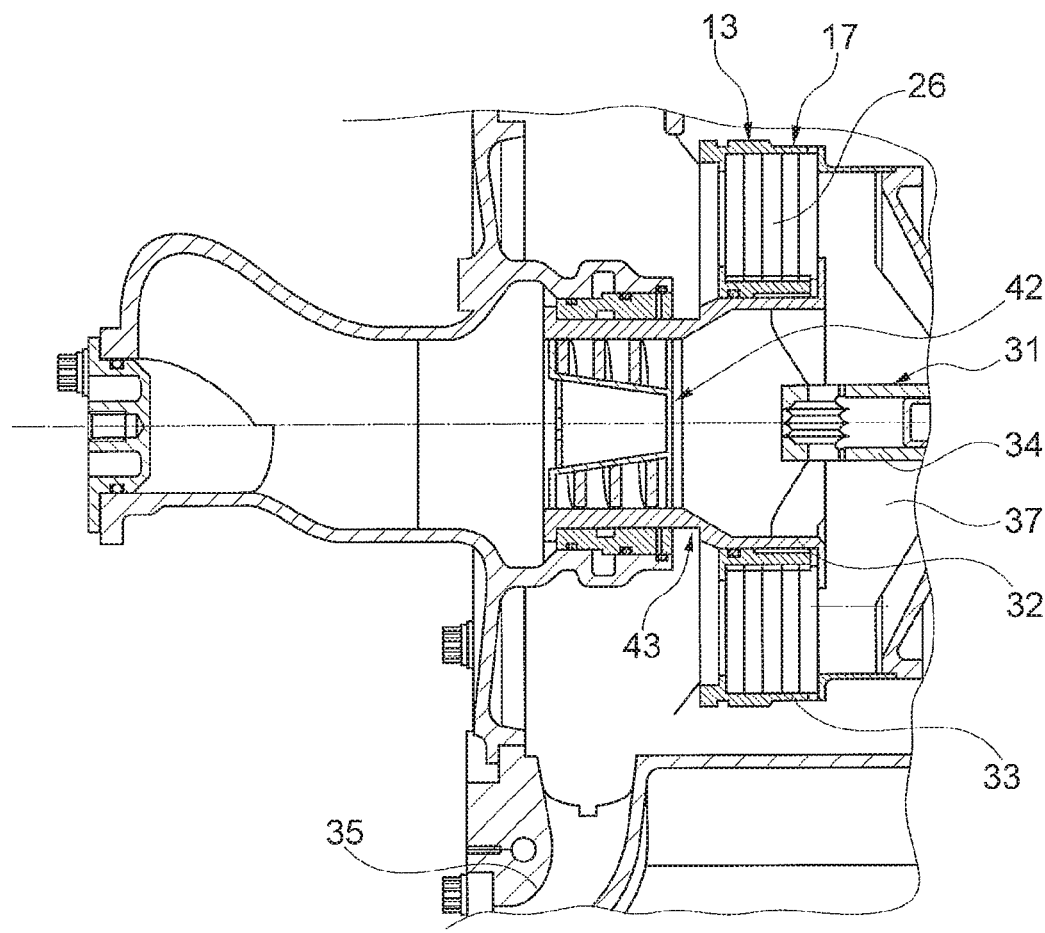
Figure 8:
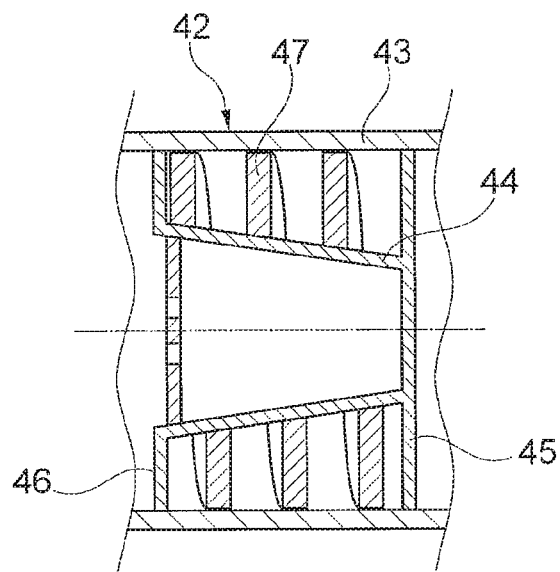
Figure 9:
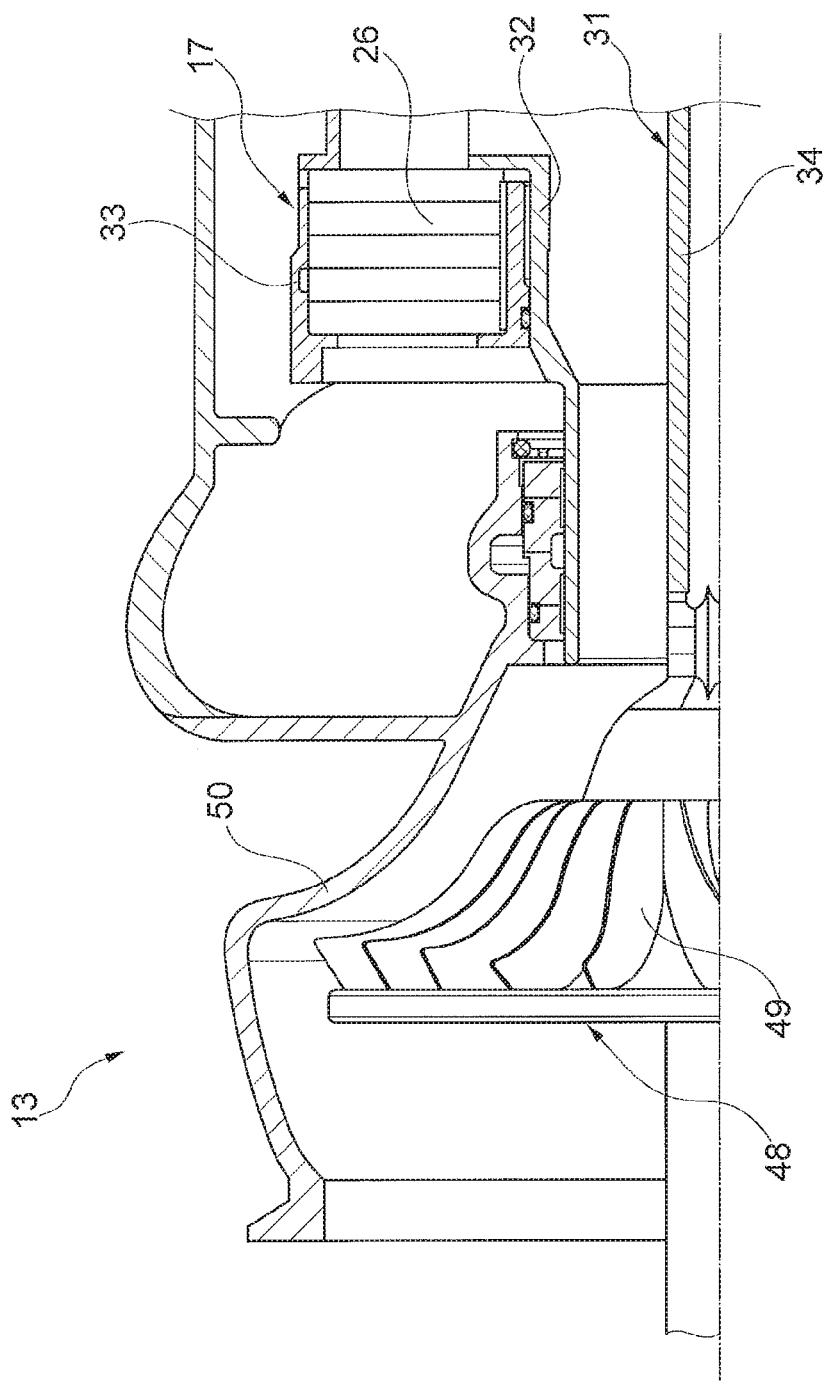
Figure 10:
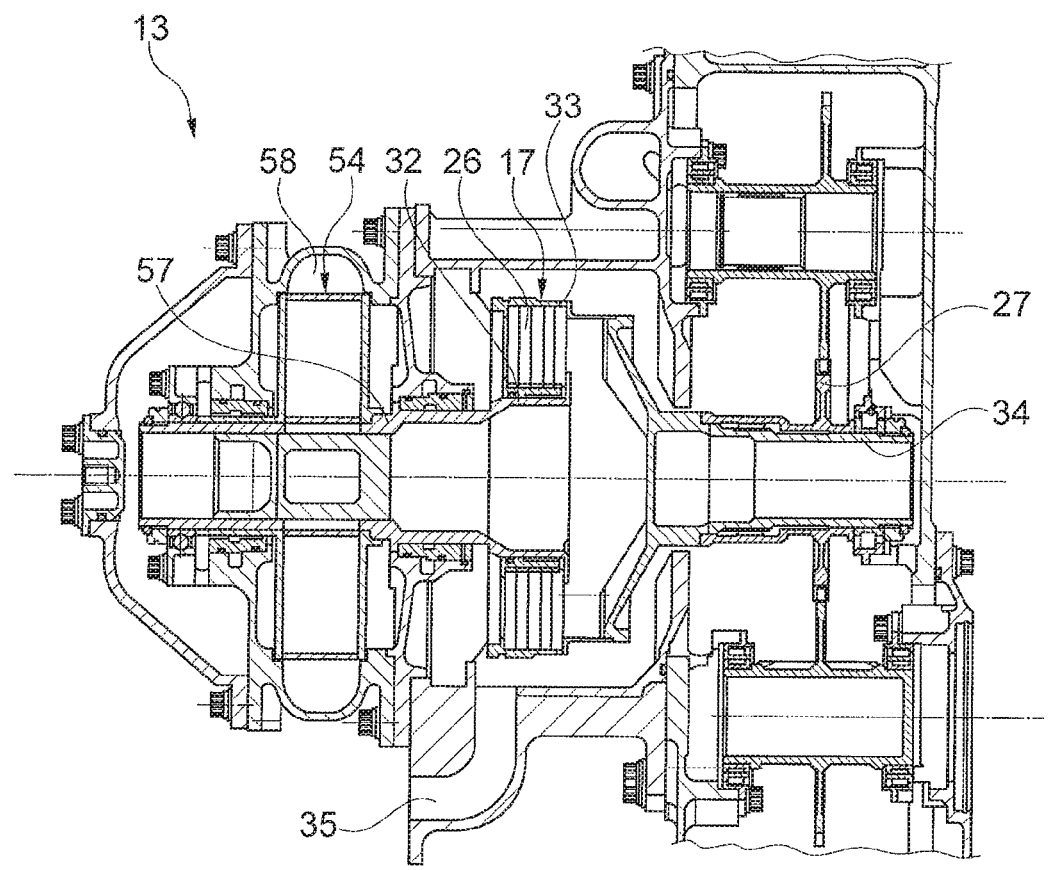
Figure 11:
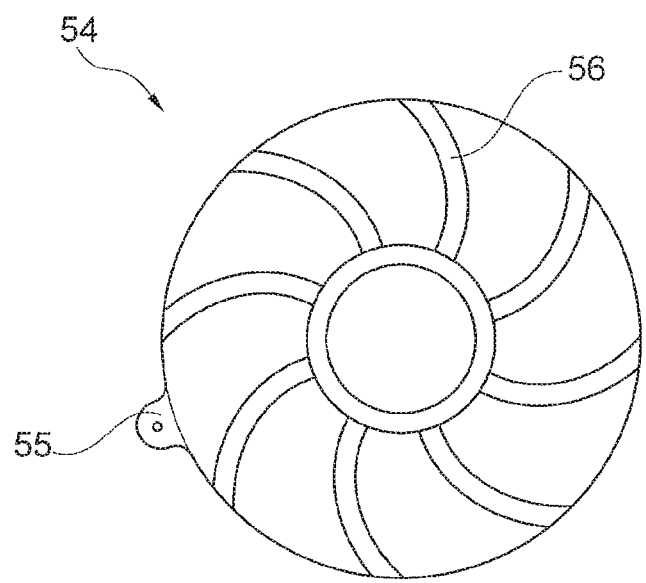

In the drawing,

FIG. 1 shows a highly schematized longitudinal sectional view of an aircraft engine with an accessory gearbox arranged in the fan casing, where a line area can be seen, using which in the area of a device for separating oil cleaned air can be introduced into a bypass duct downstream of a hollow strut provided for the passage of fluids, FIG. 2 shows a representation of an aircraft engine corresponding to FIG. 1, where in the area of a device for separating oil cleaned air can be introduced into the bypass duct via a line area upstream of the hollow strut, FIG. 3 shows a representation of an aircraft engine corresponding to FIG. 1 and FIG. 2, where an accessory gearbox is fitted in the area of a casing separating a bypass duct from an engine core, and where a line area can be seen, using which in the area of the device for separating oil cleaned air can be introduced into the bypass duct downstream of the hollow strut, FIG. 4 shows a highly schematized representation of a partial area of the aircraft engine in accordance with FIG. 1 to FIG. 3, that includes the accessory gearbox with a device for separating oil and a unit for increasing a pressure, FIG. 5 shows an enlarged representation of an area of the accessory gearbox in accordance with FIG. 4 with a first embodiment of the unit for increasing the pressure, FIG. 6 shows a simplified view of the unit for increasing the pressure in accordance with FIG. 5 in the longitudinal direction of the unit in stand-alone position, FIG. 7 shows an enlarged representation of the area of the accessory gearbox corresponding to FIG. 5 with a second embodiment of the unit for increasing the pressure, FIG. 8 shows a cutout of a simplified sectional view along a longitudinal center axis of the unit for increasing the pressure in accordance with FIG. 7, FIG. 9 shows an enlarged representation of an area of the accessory gearbox in accordance with FIG. 4 with a third embodiment of the unit for increasing the pressure, FIG. 10 shows an enlarged representation of an area of the accessory gearbox in accordance with FIG. 4 with a fourth embodiment of the unit for increasing the pressure, and FIG. 11 shows a simplified view of the unit for increasing the pressure in accordance with FIG. 10 in the longitudinal direction of the unit in stand-alone position.

FIG. 1 shows an aircraft engine or a jet engine 1 in a longitudinal sectional view. The aircraft engine 1 is provided with a bypass duct 2 and an intake area 3, where a fan 4 adjoins downstream the intake area 3 in a manner known per se. Again downstream of the fan 4, the fluid flow in the aircraft engine 1 splits into a bypass flow and a core flow, with the bypass flow passing through the bypass duct 2 and the core flow into an engine core 5 or a core flow duct, respectively which is in turn designed in a manner known per se with a compressor device 6, a burner 7 and a turbine device 8.

The turbine device 8 has in the present invention three rotor devices 9, 10 and 11 of substantially comparable design which are connected to an engine axis 12.

In the embodiment of the jet engine 1 according to FIG. 1 and FIG. 2, an accessory drive gearbox or accessory gearbox 13 is arranged in an outer engine casing 14 that limits the bypass duct 2 radially on the outside and represents the outer circumferential area of the jet engine 1. The accessory gearbox 13 is in the present invention connected via a drive shaft 15 running in the radial direction of the jet engine 1 and via an inner transmission 16A to the engine axis 12 and is thus driven or supplied with torque by the engine axis 12 during operation of the jet engine 1. Various ancillary units 16 and a device 17 or an oil separator, also referred to as a breather, are subjected to torque to the required extent by the accessory gearbox 13. In addition, in the area of the accessory gearbox 13 an oil tank 18 too is provided which represents a hydraulic fluid reservoir from which is drawn oil for cooling and lubricating various areas of the jet engine 1, such as bearing units, gear pairings of the inner transmission 16A and the accessory gearbox 13 and further assemblies of the jet engine 1 to be cooled and lubricated.

In contrast to this, the accessory gearbox 13 with the ancillary units 16 and the oil separator 17 in the embodiment of the jet engine 1 according to FIG. 3 is arranged in the radial direction between the bypass duct 2 and the engine core 5 in a component 19 limiting both the bypass duct 2 and the engine core 5.

FIG. 4 shows in a highly schematized form that part of the aircraft engine 1 in which the accessory gearbox 13 is arranged. The oil separator 17 is connected in the present invention to the oil tank 18, to a front bearing chamber 20, to a rear bearing chamber 21 and to an interior 22 of a casing 23 of the accessory gearbox 13, all of which represent areas of the aircraft engine 1 supplied with oil. The bearing chambers 20, 21 are supplied during operation of the aircraft engine 1 with oil out of the oil tank 18 for lubrication and cooling.

In the embodiment of the aircraft engine 1 shown in FIG. 4, one air-oil volume flow from the front bearing chamber 20 and one from the rear bearing chamber 21 can be routed in the direction of a line area 24 which in the present invention issues into a pre-chamber 25 upstream of the oil separator 17. Furthermore, the oil tank 18 too in the present invention is connected to the pre-chamber 25 to permit introduction of an air-oil volume flow out of the oil tank 18 and of the air-oil volume flows out of the bearing chambers 20, 21 tangentially into the pre-chamber 25 via the line area 24. Moreover, the interior 22 of the casing 23 of the accessory gearbox 13 is also connected to the pre-chamber 25, where with appropriate pressure applied to the interior 22 an air-oil volume flow out of the casing 23 of the accessory gearbox 13 is also preferably introduced tangentially into the pre-chamber 25. The pre-chamber 25 is connected to the oil separator 17, in the interior of which a porous area 26 is rotatably arranged and can be flowed through by the air-oil volume flow exiting the pre-chamber 25.

The porous area 26 can, in the present invention, be driven by the accessory gearbox 13 via a gear 27 in operative connection with further gears driving different ancillary units 16 of the accessory gearbox 13, and acts as a centrifuge permitting the proportion of oil of the air-oil volume flow through the porous area 26 to be reduced as far as possible. The proportion of oil of the air-oil volume flow in the oil separator 17 is reduced by separation of the oil from the air in the zone of the porous area 26 on the one hand as when flowing through an impingement filter and on the other hand as in the area of a centrifuge, by the rotation of said porous area 26. The oil filtered out of the air-oil volume flow in the zone of the porous area 26 is drawn off in the outer area of the oil separator 17 in a manner not shown in detail by a pump device and returned to the oil tank 18. The cleaned airflow in the area of the oil separator 17, i.e. a fluid volume flow having a lower oil load than the air-oil volume flow supplied to the oil separator, is supplied via a line area 29 to a separate unit 28 for increasing a pressure and arranged here in the interior of the line area 29, and discharged out of the aircraft engine 1 via a further line area 30 downstream of the unit 28 and adjoining it. The fluid volume flow exiting the aircraft engine 1 has a very low oil load, so that no outwardly visible smoke plume is generated during operation of the aircraft engine 1.

FIG. 5 shows a sectional view of a cutout of the accessory gearbox 13 in FIG. 4 in more detail, where an accessory gearbox shaft 31 driven by the gear 27 and designed at least in some areas as a hollow shaft can be discerned. The accessory gearbox shaft 31 has here wall areas 32, 33, 34 arranged on various radial circumferences and non-rotatably connected to one another here by ribs or fillets 37 arranged spread over the circumferential side. The oil separator 17 is arranged with its porous area 26 in the radial direction between a central wall area 32 and an outer wall area 33 of the accessory gearbox shaft 31. The unit 28 designed here as an axial compressor device for increasing a pressure is in the present invention arranged in the radial direction between the accessory gearbox shaft 31 designed between the central wall area 32 and the inner wall area 34 as a hollow shaft, where the line area 29 is formed at least in some sections by the central wall area 32 and the inner wall area 34. In the embodiment shown, therefore, both the device 17 and the unit 28 are advantageously driven jointly by a single accessory gearbox shaft 31.

The device 17 is supplied with an air-oil volume flow via an inlet opening 35, said air-oil volume flow passing through the porous area 26 of the device 17 substantially in the axial direction of the accessory gearbox shaft 31. Oil is here separated out of the air-oil volume flow and discharged in the radial direction outwards through the porous area 26. The fluid volume flow at least partially cleaned of oil or the cleaned air is then diverted by 180° in the direction of the unit 28 for increasing the pressure, where the entire cleaned airflow discharged from the oil separator 17 is supplied to the unit 28 via the line area 29.

The unit 28, of which a view in the longitudinal direction is shown in FIG. 6, has several blades 36 spread over the circumference, using which a pressure of the cleaned airflow is increased downstream of the unit 28 and inside the line area 29 depending on the rotational speed of the accessory gearbox shaft 31. The blades 36 are here designed in an inner diameter area with a hub area 36A and in an outer diameter area with a rim area 36B. The hub area 36A is here connected to the inner wall area 34 and the rim area 36B to the central wall area 32 of the accessory gearbox shaft 31, with the inner wall area 34 and the central wall area 32 forming the line area 29.

To increase the pressure downstream of the unit 28 in simple manner during operation of the aircraft engine 1, the blades 36 are curved or inclined to the required extent in the radial direction, in the axial direction and/or in the circumferential direction of the accessory gearbox shaft 31. Due to the achieved pressure increase of the cleaned airflow downstream of the unit 28, the cleaned airflow can be introduced to the required extent also into an area of the aircraft engine 1 in which high pressures prevail in comparison to an ambient pressure. In the embodiments according to FIG. 1 to FIG. 3, it is provided that the cleaned airflow is introduced into the bypass duct 2 via the further line area 30 interacting with the line area 29.

In embodiments of the invention alternative to this, it can also be provided that the cleaned air is introduced into the core flow or the engine core or is discharged to the environment being at ambient pressure.

In the embodiments according to FIG. 1 and FIG. 3, the further line area 30 issues into the bypass duct 2 downstream of a hollow strut 38 passing through the bypass duct 2 in the radial direction, whereas in the embodiment according to FIG. 2 the further line area 30 issues into the bypass duct 2 upstream of the hollow strut 38. In principle, the further line area 30 can issue at any required point into the bypass duct 2 or even into the engine core 5 or core flow duct, since by designing the blades 36 of the unit 28 depending on the speed of the accessory gearbox shaft 31, a large pressure difference can be set as required between the pressure downstream of the unit 28 and the pressure in the area for introduction of the bypass duct 2, the engine core 5 or the environment. It can for example also be provided that the further line area 30 issues into an area of the engine 1 referred to as a mixer 39 in which the bypass duct 2 is converged with the engine core 5.

The blades of the unit can, in an alternative embodiment of the invention, be designed integral with the ribs or fillets, where said ribs or fillets can here be designed curved or inclined, by analogy with the blades 36 of the unit 28 in the area of their downstream-facing ends.

In a further embodiment of a unit 42 designed as an axial compressor device for increasing a pressure, the unit according to FIG. 7 and FIG. 8 has a helically designed area 47. The unit 42 is here arranged inside a line area 43 designed with a constant and circular cross-section, with the unit 42 taking up the entire cross-section of the line area 43 and being fixed in the axial direction of the accessory gearbox shaft 31 in the present invention by spring-loaded locking rings 43, 44 in the line area 43. For non-rotatable connection to the line area 43, which is here formed by the central wall area 32 of the accessory gearbox shaft 31, a tongue-and-groove connection not shown in detail can for example be provided, so that the unit 42 is driven by the accessory gearbox shaft 31 in a similar way to the unit 28 jointly with the oil separator 17.

The unit 42 has here a conical inner wall area 44 shown in more detail in FIG. 8 onto which the helical area 37 on the circumferential side and running in the axial direction, is integrally shaped. The conical wall area 44 is here arranged between ribs 45, 46 limiting the unit 42 in the axial direction of the accessory gearbox shaft 31, where inlet openings or outlet openings are provided between the ribs 45, 46 for the cleaned airflow supplied to the unit 42 from the oil separator 17. The wall area 44 is here designed such that a cross-section flowed through by the cleaned airflow in the area of the unit 42 decreases in the axial direction of the accessory gearbox shaft 31.

The cleaned airflow in the area of the unit 42 is subjected to pressure via the unit 42 too, such that the cleaned airflow downstream of the unit 42 has a higher pressure than upstream of the unit 42 and in turn can be supplied to the required extent via the further line area 30 to the bypass duct 2, to the engine core 5 or to the environment.

FIG. 9 shows a unit 48 designed as a radial compressor device and in turn arranged radially inside a line area 50, i.e. in an interior formed by the line area 50. The line area is formed here by the central wall area 32 of the accessory gearbox shaft 31 and is therefore driven jointly with the oil separator 17 by the accessory gearbox shaft 31. The unit 48 is in the present invention non-rotatably mounted on the inner wall area 34 of the accessory gearbox shaft 31 and has a plurality of blades 49 arranged on the circumferential side and via which the cleaned airflow is supplied to the unit 48 from the oil separator 17, accelerated from an axial direction of the accessory gearbox shaft 31 into a radial direction of the accessory gearbox shaft 31 and then in turn diverted into an axial direction of the accessory gearbox shaft 31.

The line area 50 has in the area of the unit 48 a diameter course adapted in particular to a shape of the blades 49 in the axial direction of the accessory gearbox shaft 31, where the blades 49 of the unit 48 can be curved or inclined, by analogy with the blades 36, to achieve a required pressure increase.

A pressure of the cleaned airflow downstream of the unit 48 can also be increased by the unit 48 in a comparable manner to the units 28, 42 described above, such that the airflow can be supplied in the previously described manner via the further line area 30 to the bypass duct 2, to the engine core 5 or to the environment.

With the unit 48, a high pressure of the cleaned airflow downstream of the unit 48 relative to the pressure of the cleaned airflow upstream of the unit 48 can also be achieved in comparison with the units 28, 42 when the cleaned airflow has only a low volume flow.

A further embodiment of a unit 54 for increasing a pressure designed as a radial compressor device is shown in FIG. 10 and FIG. 11. The unit 54 is here radially mounted outside the central wall area 32 of the accessory gearbox shaft 31 forming a line area 57 at least in some sections upstream of the unit 54. The unit 54 can be non-rotatably fixed relative to the accessory gearbox shaft 31 via a connecting point 55 shown in more detail in FIG. 11 and is thus driven jointly with the oil separator 17 by the accessory gearbox shaft 31.

The unit 54 has, as shown in FIG. 11, several blades 56 arranged spread over the circumferential side and each designed curved or bent in the circumferential direction of the accessory gearbox shaft 31.

An airflow supplied from the oil separator 17 to the unit 54 via the line area 57 is diverted in the radial direction in the area of the unit 54 and accelerated. As a result, the cleaned airflow is passed to the outside in the radial direction through recesses of the central wall area 32 in the area of the unit 54, such that said unit 54 itself forms part of the line area 57. The cleaned airflow is, after acceleration and diversion by the unit 54, supplied to the bypass duct 2, to the engine core 5 or to the environment via hollow spaces 58 arranged radially outside said unit 54 and via the further line area 30 connected to said hollow spaces 58 in the manner described above in more detail.

All embodiments of the units 28, 42, 48, 54 have in common that due to the pressure increase of the cleaned airflow during operation of the aircraft engine 1 downstream of the respective unit 28, 42, 48, 54 a pressure upstream of the respective unit 28, 42, 48, 54 is reduced. As a result the air-oil volume flow supplied to the oil separator 17 from the bearing chambers 20, 21 is advantageously drawn in the direction of the oil separator 17, and a lower pressure prevails in the area of the bearing chambers 20, 21 compared with conventional embodiments. This has the advantage that little or no air at high pressure out of the engine core 5 is required for sealing off the bearing chambers 20, 21 compared with conventional embodiments without a unit 28, 42, 48, 54.

LIST OF REFERENCE NUMERALS

1 Jet engine
2 Bypass duct
3 Intake area
4 Fan
5 Engine core
6 Compressor device
7 Burner
8 Turbine device
9, 10, 11 Rotor device
12 Engine axis
13 Accessory gearbox
14 Engine casing
15 Drive shaft
16 Ancillary units
16A Inner transmission
17 Device, oil separator
18 Oil tank
19 Component
20 Front bearing chamber
21 Rear bearing chamber
22 Interior
23 Casing
24 Line area
25 Pre-chamber
26 Porous area
27 Gear
28 Unit
29 Line area
30 Further line area
31 Accessory gearbox shaft
32 Central wall area
33 Outer wall area
34 Inner wall area
35 Inlet opening
36 Blade
36A Hub area
36B Outer rim area
38 Rib
39 Hollow strut
39 Mixer
42 Unit
43 Line area
44 Conical wall area
45, 46 Ribs
48 Helically designed area
48 Unit
49 Blades
50 Line area
54 Unit
55 Connecting point
56 Blades
57 Line area
58 Hollow space

What is claimed is:

1. An aircraft engine comprising:
a line area,
a separating device for separating oil from an air-oil volume flow, to provide a fluid volume flow with a lower oil load than the air-oil volume flow supplied to the separating device, the fluid volume flow being discharged from the separating device via the line area,
wherein the fluid volume flow can be supplied via the line area to a pressure increasing unit by which a pressure in the line area downstream of the pressure increasing unit can be increased;
wherein the line area includes an accessory gearbox shaft of an accessory gearbox, the accessory gearbox shaft being hollow in at least some sections and at different radial circumferences to form an outer wall region having a first radial dimension, a middle wall region having a second radial dimension less than the first radial dimension and an inner wall region having a third radial dimension less than the second radial dimension;
wherein the separating device is arranged in a radial direction between the middle wall region and the outer wall region; and
wherein the pressure increasing unit is arranged in the radial direction between the middle wall region and the inner wall region;
wherein the pressure increasing unit is a compressor device, including at least one chosen from an axial compressor and a radial compressor;
wherein the pressure increasing unit includes a plurality of blades spaced over a circumferential side;
wherein the plurality of blades are bent or curved relative to a flow direction of the fluid volume flow in at least one chosen from an axial direction, the radial direction and a circumferential direction;

wherein the plurality of blades are integral with ribs provided for mounting an area of the separating device; the accessory gearbox.

2. The aircraft engine in accordance with claim 1, wherein the line area is connected to a further line area issuing into a core flow duct or a bypass duct of the aircraft engine.

3. The aircraft engine in accordance with claim 1, wherein the separating device is driven by the accessory gearbox shaft.

4. The aircraft engine in accordance with claim 1, wherein the accessory gearbox is arranged in an area of an outer casing of the aircraft engine.

5. The aircraft engine in accordance with claim 1, wherein the accessory gearbox is arranged in an area of a casing separating a bypass duct from a core flow duct of the aircraft engine.

6. The aircraft engine in accordance with claim 1, wherein the pressure increasing unit includes a helical area.

7. The aircraft engine in accordance with claim 1, wherein the pressure increasing unit is driven by the accessory gearbox shaft.

8. The aircraft engine in accordance with claim 7, wherein the separating device is driven by the accessory gearbox shaft.

* * * * *